United States Patent
Acharya (10) Patent No.: US 7,613,821 B1
(45) Date of Patent: Nov. 3, 2009

(54) ARRANGEMENT FOR REDUCING APPLICATION EXECUTION BASED ON A DETERMINED LACK OF FLOW CONTROL CREDITS FOR A NETWORK CHANNEL

(75) Inventor: Yatin Acharya, Sunnyvale, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 2027 days.

(21) Appl. No.: 09/905,080

(22) Filed: Jul. 16, 2001

(51) Int. Cl.
G06F 15/16 (2006.01)
(52) U.S. Cl. .................. 709/235; 709/231; 709/232; 709/234; 370/229; 370/230; 370/233; 370/234
(58) Field of Classification Search ............... 709/213, 709/226, 229, 231, 232, 234, 235; 370/229, 370/230, 231, 232, 235, 236, 233, 234; 710/263; 711/170
See application file for complete search history.

(56) References Cited

U.S. PATENT DOCUMENTS

| | | | | |
|---|---|---|---|---|
| 5,258,979 | A * | 11/1993 | Oomuro et al. | 370/232 |
| 6,046,979 | A * | 4/2000 | Bauman | 370/229 |
| 6,192,406 | B1 * | 2/2001 | Ma et al. | 709/226 |
| 6,243,787 | B1 * | 6/2001 | Kagan et al. | 710/263 |
| 6,816,889 | B1 * | 11/2004 | Graham | 709/213 |
| 2001/0043564 | A1 * | 11/2001 | Bloch et al. | 370/230 |
| 2002/0085493 | A1 * | 7/2002 | Pekkala et al. | 370/235 |
| 2002/0150049 | A1 * | 10/2002 | Collier et al. | 370/236 |
| 2002/0159385 | A1 * | 10/2002 | Susnow et al. | 370/229 |
| 2004/0064664 | A1 * | 4/2004 | Gil | 711/170 |
| 2004/0081394 | A1 * | 4/2004 | Biran et al. | 385/31 |

OTHER PUBLICATIONS

Daniel Cassiday, InfiniBand™ Architecture Tutorial, Hot Chips, Aug. 2000, Sun Microsystems, 79 pages.

* cited by examiner

Primary Examiner—Thu Ha T Nguyen
(74) Attorney, Agent, or Firm—Manelli Denison & Selter PLLC; Leon R. Turkevich (57) ABSTRACT

An InfiniBand™ network node includes a network interface, a system memory, a memory controller configured for controlling access to the system memory, and a processor. The network interface is configured for outputting data packets according to a prescribed flow control protocol that specifies flow control resources. The network interface also is configured for outputting a data flow interruption request to the memory controller based on a determined depletion of the flow control resources. The memory controller, in response to reception of the data flow interruption request, restricts access to the system memory. Hence, the processor, in response to detecting the restricted access to the system memory, reduces execution of a prescribed application resource based on the determined depletion of the flow control resources. Hence, the supply of data for the data packets is reduced based on the reduced execution of the prescribed application resource, enabling flow control protocols to be maintained while preserving processor and memory resources for other application resources.

13 Claims, 4 Drawing Sheets

ARRANGEMENT FOR REDUCING APPLICATION EXECUTION BASED ON A DETERMINED LACK OF FLOW CONTROL CREDITS FOR A NETWORK CHANNEL

BACKGROUND OF THE INVENTION

1. Field of the Invention

The present invention relates to flow control systems used to manage network traffic output by network nodes, for example in a host channel adapter in an InfiniBand™ server system.

2. Background Art

Networking technology has encountered improvements in server architectures and design with a goal toward providing servers that are more robust and reliable in mission critical networking applications. In particular, the use of servers for responding to client requests has resulted in a necessity that servers have an extremely high reliability to ensure that the network remains operable. Hence, there has been a substantial concern about server reliability, accessibility, and serviceability.

In addition, processors used in servers have encountered substantial improvements, where the microprocessor speed and bandwidth have exceeded the capacity of the connected input/out (I/O) buses, limiting the server throughput to the bus capacity. Accordingly, different server standards have been proposed in an attempt to improve server performance in terms of addressing, processor clustering, and high-speed I/O.

These different proposed server standards led to the development of the InfiniBand™ Architecture Specification, (Release 1.0), adopted by the InfiniBand™ Trade Association. The InfiniBand™ Architecture Specification specifies a high-speed networking connection between central processing units, peripherals, and switches inside a server system. Hence, the term "InfiniBand™ network" refers to a network within a server system. The InfiniBand™ Architecture Specification specifies both I/O operations and interprocessor communications (IPC).

A particular feature of InfiniBand™ Architecture Specification is the proposed implementation in hardware of the transport layer services present in existing networking protocols, such as TCP/IP based protocols. The hardware-based implementation of transport layer services provides the advantage of reducing processing requirements of the central processing unit (i.e., "offloading"), hence offloading the operating system of the server system.

Figure 1:
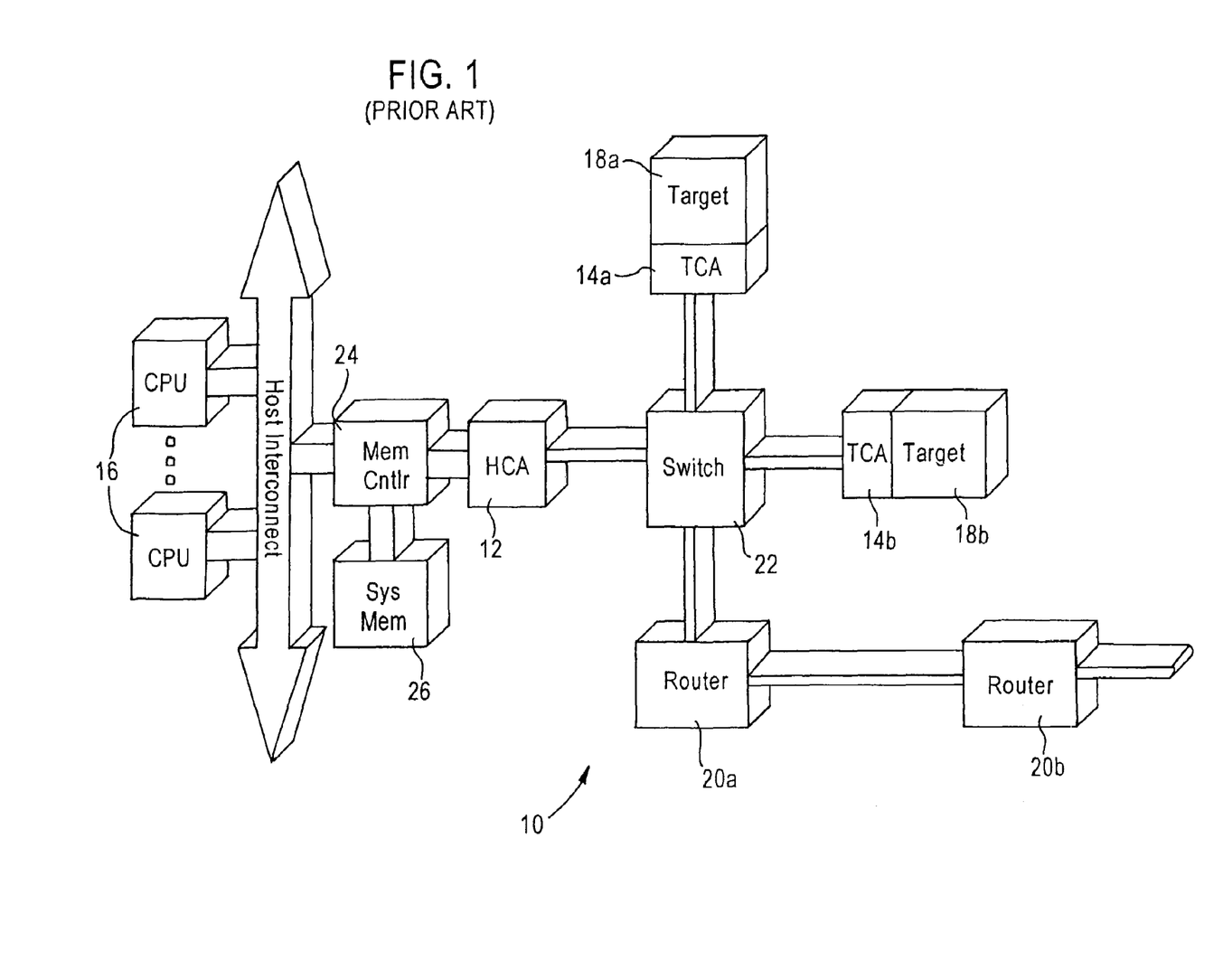
FIG. 1 is a block diagram illustrating a conventional network according to the InfiniBand™ Architecture Specification.

The InfiniBand™ Architecture Specification describes a network architecture, illustrated in FIG. 1. The network 10 includes channel adapters 12 and 14, processor nodes 16, peripherals 18 such as Ethernet bridges or storage devices, routers 20, and InfiniBand™ switches 22. Channel adapters operate as interface devices for respective server subsystems. For example, host channel adapters (HCAs) 12 are used to provide processor nodes 16 with an interface connection to the InfiniBand™ network 10, and target channel adapters (TCAs) 14 are used to provide the peripherals 18 with an interface connection to the InfiniBand™ network. Host channel adapters 12 may be connected to a memory controller 24 as illustrated in FIG. 1. Host channel adapters 12 implement the transport layer using a virtual interface referred to as the "verbs" layer that defines in the manner in which the processor 16 and the operating system communicate with the associated HCA 12: verbs are data structures (e.g., commands) used by application software to communicate with the HCA. Target channel adapters 14, however, lack the verbs layer, and hence communicate with their respective devices 18 according to the respective device protocol (e.g., PCI, SCSI, etc.).

The InfiniBand™ Architecture Specification requires that a packet to be sent via an HCA 12 undergoes transport layer service, followed by link layer service. Examples of operations performed during transport layer service include constructing a transport layer header, generating a packet sequence number, validating service type, etc. Examples of operations performed during link layer service include service layer and virtual layer mapping (SL-VL mapping), link layer flow control packet generation, link layer transmission credit checking, etc.

However, arbitrary hardware implementations may result in substantially costly hardware designs, or network congestion. For example, the InfiniBand™ Architecture Specification describes a flow control arrangement, where each virtual lane (VL) has a corresponding number of flow control credits. However, conventional approaches to implementing flow control result in interruption of data flows, dropped packets, etc., resulting in poor utilization of memory and processor resources.

SUMMARY OF THE INVENTION

There is a need for an arrangement that enables a computing node, configured for outputting data onto a data network according to prescribed flow control protocols, to execute applications configured for outputting data onto the data network in an efficient and economical manner.

These and other needs are attained by the present invention, where a network node includes a network interface, a system memory, a memory controller configured for controlling access to the system memory, and a processor. The network interface is configured for outputting data packets according to a prescribed flow control protocol that specifies flow control resources. The network interface also is configured for outputting a data flow interruption request to the memory controller based on a determined depletion of the flow control resources. The memory controller, in response to reception of the data flow interruption request, restricts access to the system memory. Hence, the processor, in response to detecting the restricted access to the system memory, reduces execution of a prescribed application resource based on the determined depletion of the flow control resources. Hence, the supply of data for the data packets is reduced based on the reduced execution of the prescribed application resource, enabling flow control protocols to be maintained while preserving processor and memory resources for other application resources.

One aspect of the present invention provides a method in a network node. The method includes detecting by a network interface a depletion of flow control resources representing a depletion of network bandwidth for a prescribed data stream, and outputting by the network interface a data flow interruption request based on the detected depletion of flow control resources. The method also includes reducing, by a processor and based on the data flow interruption request, the prescribed data stream by reducing execution of a prescribed application resource configured for generating the prescribed data stream. Outputting of the data flow interruption request based on the detected depletion of flow control resources enables the processor to detect the unavailability of network resources for transport of generated data streams. Hence, the processor reduces the data stream by reducing execution of the application resource generating the prescribed data stream, for example by temporarily halting the execution, executing the prescribed application such that it generates InfiniBand™ network traffic at a lower data rate, etc. Hence, network congestion can be resolved without the necessity of wasting resources by dropping packets generated by the processor and stored in a system memory.

Another aspect of the present invention provides a network node comprising a network interface and a processor. The network interface is configured for detecting a depletion of flow control resources representing a depletion of network bandwidth for a prescribed data stream. The network interface also is configured for outputting a data flow interruption request based on the detected depletion of flow control resources. The processor is configured for executing a prescribed application resource for generation of the prescribed data stream, and is configured for reducing the prescribed data stream by reducing execution of the prescribed application resource, based on the data flow interruption request.

Additional advantages and novel features of the invention will be set forth in part in the description which follows and in part will become apparent to those skilled in the art upon examination of the following or may be learned by practice of the invention. The advantages of the present invention may be realized and attained by means of instrumentalities and combinations particularly pointed in the appended claims.

BRIEF DESCRIPTION OF THE DRAWINGS

Reference is made to the attached drawings, wherein elements having the same reference numeral designations represent like elements throughout and wherein.

BEST MODE FOR CARRYING OUT THE INVENTION

Figure 2:
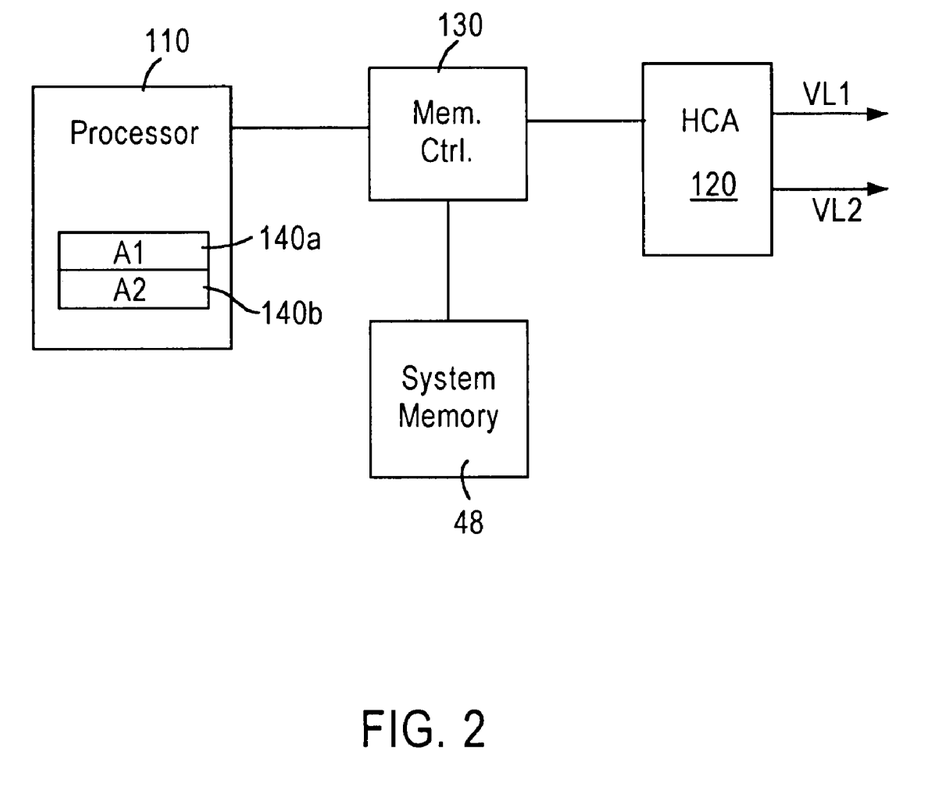
FIG. 2 is a diagram illustrating an InfiniBand™ network node configured for selectively reducing a prescribed data stream based on reduced execution of a prescribed application resource due to depletion of network bandwidth, according to an embodiment of the present invention.

FIG. 2 is a block diagram illustrating a network node 30 having a processor 110, a network interface 120 such as a host channel adapter (HCA), and a memory controller 130 configured for controlling access to system memory resources 48.

The processor 110 is configured for executing multiple application resources 140 for generation of respective data streams. For example, the application 140a (A1) may be a media streaming application, and the application 140b (A2) may be a file transfer application. Execution of the applications 140 by the processor 110 causes the generation of work queue entries (WQEs) that result in the generation of respective data streams by the HCA 120 according to InfiniBand™ protocol.

As described below, the HCA 120 outputs the data packets onto assigned virtual lanes having respective flow control credits. However if the InfiniBand network encounters congestion in the form of a depletion of network bandwidth, indicated by a depletion of flow control credits (i.e., flow control resources) for a corresponding virtual lane, the HCA 120 must halt transmission of the data stream on the affected virtual lane, regardless of whether the data packets have already been generated.

According to the disclosed embodiment, the network interface is configured for outputting a data flow interruption request to the memory controller 130 in response to detecting a depletion of flow control resources for a prescribed virtual lane (e.g., VL1). The memory controller 130, in response to reception of the data flow interruption request, renders unavailable the system memory resources 48 for the application resource (e.g., A1) associated with the affected virtual lane (VL1); application resources serviced by other virtual lanes (e.g., A2 serviced by VL2) remain unaffected, enabling the continued data flow of the application resources serviced by other virtual lanes. The processor 110, and response to detecting the unavailability of the system memory resources 48 for the corresponding application resource (A1), reduces the prescribed data stream by reducing execution of the corresponding application resource (A1), for example by temporarily suspending execution until reception of a resume data flow request indicating replenishment of the flow control resources for the prescribed data stream (VL1).

Figure 3:
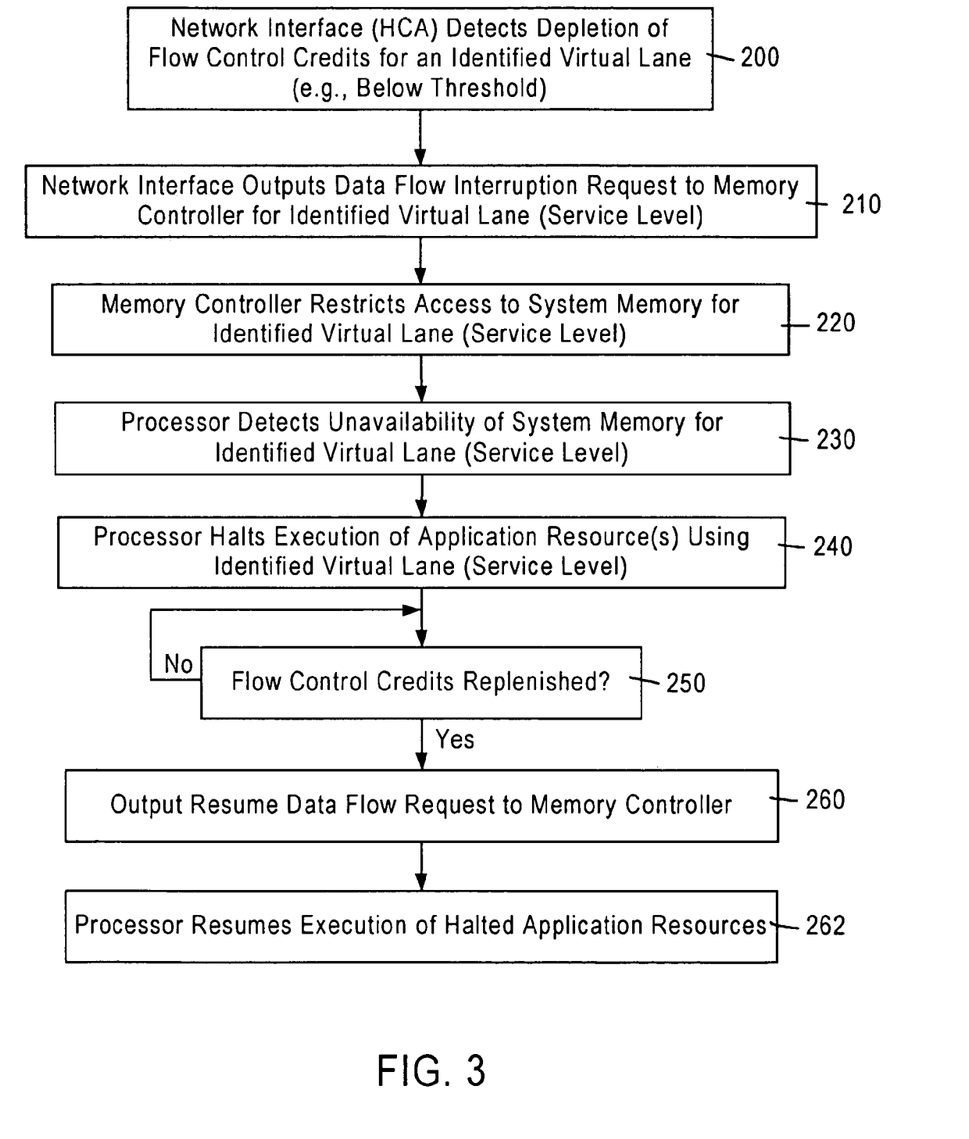
FIG. 3 is a flow diagram illustrating the method for selectively reducing data flow by reduced execution of a prescribed application resource, based on detected depletion of flow control resources, according to an embodiment of the present invention.

FIG. 3 is a diagram illustrating the method for selectively reducing data flow by reduced execution of a prescribed application resource, based on detected depletion of flow control resources, according to an embodiment of the present invention.

The method begins in step 200, where the network interface (i.e., the HCA 120) detects a depletion of flow control credits for an identified virtual lane below a prescribed threshold. The network interface 120 in response outputs in step 210 a data flow interruption request to the memory controller 130 for the identified virtual lane, which alternatively may be identifiable by the corresponding service level based on a service level—virtual lane mapping table, described below. The memory controller 130, in response to receiving the data flow interruption request, restricts in step 220 access by the processor 110 to system memory for the identified virtual lane (service level).

The processor 110, in response to detecting in step 230 the unavailability of the system memory 48 for the identified virtual lane (or the identified service level), halts in step 240 the execution of the application resources utilizing the identified virtual lane, or alternatively based on identification of the corresponding service level. For example, if the application resource 140a (A1) was generating messages to be output according to the identified service level for a prescribed application transaction, the processor 110 would halt execution of the prescribed application transaction based on detecting the unavailability of the system memory 48 for the virtual lane VL1. Hence, the supply of messages to the HCA 120 is suspended, relieving network congestion while reserving the processor capacity and memory resources for other applications (e.g., 140b) having a different service level, and hence a different virtual lane (e.g., VL2) having sufficient flow control credits.

The network interface 120 monitors the flow control credits in step 250 for the affected virtual lane to determine whether the flow control credits have been replenished. If the flow control credits have been replenished, the network interface 120 outputs a resume data flow request to the memory controller 130 in step 260, causing the memory controller 132 allow access to the system memory 48 for the affected virtual lanes (service level). The processor 110 in response resumes execution of the halt the application resources (e.g., 140*a*) in step 262.

Figure 4:
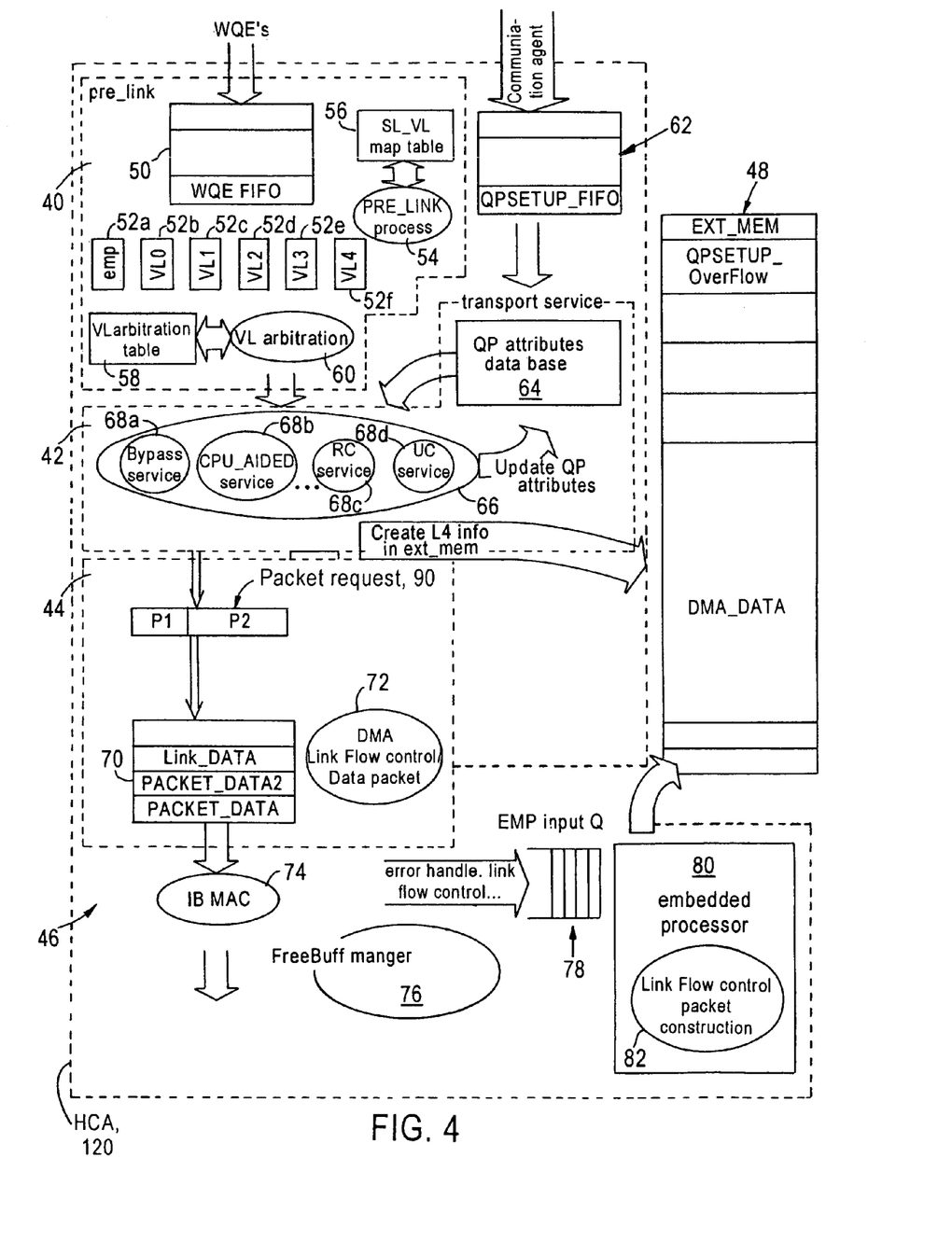
FIG. 4 is a diagram illustrating in detail the host channel adapter of FIG. 2 according to an embodiment of the present invention.

FIG. 4 is a diagram illustrating in detail the HCA 120 according to an embodiment of the present invention. The HCA 120, compliant with the InfiniBand™ Architecture Specification, is implemented in a manner that ensures that hardware resources are efficiently utilized by generating transmit packets according to a priority-based ordering. In addition, the disclosed HCA 120 provides flexibility by enabling embedded processes to be added without disruption of traffic flow. Hence, the HCA 120 can be implemented in an economical manner with minimal complexity relative to conventional implementation techniques.

One problem with conventional arrangements for implementing the HCA 120 according to the InfiniBand™ Architecture Specification is that transport layer service would be performed first, for example by constructing a transport layer header, generating a packet sequence number, validating the service type (e.g., reliable connection, reliable datagram, unreliable connection, unreliable datagram, etc.), and other transport layer operations. Once the transport layer operations have been completed, the packet would be sent to the link layer service for link layer operations, including service layer and virtual lane mapping, link layer flow control packet generation, link layer transmission credit checking, and other operations. Although this conventional type of implementation has the advantage of precisely following the network layers specified in the InfiniBand™ Architecture Specification, such an arrangement requires a substantially large amount of hardware requirements. In particular, the transport layer generally requires more processing power than the link layer because the transport layer involves more complex operations. Hence, there is a need that the implementation of the transport layer in hardware does not result in a substantially complex hardware system. In addition, there is a concern with unnecessarily wasting transport layer resources on low priority operations.

According to the disclosed embodiment, link layer operations are partitioned based on the desirability to determine priorities of data packets to be transmitted. In particular, the HCA 120 of FIG. 4 includes a pre-link module configured for determining a priority of received WQEs, and a post-link module configured for preparing a data packet for transmission on the network. As described below, the pre-link module 40 orders the WQEs according to priorities determined by the pre-link module, and outputs the WQEs in the determined order to a transport service module 42 configured for generating the appropriate transport layer headers for the WQEs based on the associated queue pair attributes. In other words, the pre-link module 40 prevents the transport service module 42 from wasting resources on low priority WQEs or blocking high priority WQEs within the transport layer process. Hence, higher priority connections obtain improved service at the transport layer through the HCA.

The HCA 120, implemented for example as an application-specific integrated circuit, includes a pre-link module 40, a transport service module 42, a post-link module 44, and a media access control (MAC) module 46. The HCA 120 also has local access to a memory 48 configured for storing transport data and overflow buffers, described below.

The pre-link module 40 includes a work queue element FIFO 50, virtual lane FIFOs 52, a pre-link process module 54, a service layer to virtual lane (SL-VL) mapping table 56, a virtual lane (VL) arbitration table 58, and a virtual lane (VL) arbitration module 60.

The HCA 120 is configured for receiving data from the central processing unit 110 in the form of work queue elements (WQEs), stored in the WQE FIFO 50. Each WQE specifies a corresponding request, from a consumer application executed by the CPU 110 (i.e., "requester"), for a corresponding prescribed operation to be performed by a destination InfiniBand™ network node (i.e., "responder"), for example a target 18*a*. The interaction between requester and responder is specified via a queue pair (QP), where a queue pair includes a send work queue and a receive work queue.

The WQE includes service level (SL) information, and a pointer to the location of the actual message in the system memory 48. The InfiniBand™ Architecture Specification defines a service level (SL) attribute that permits a packet traversing the InfiniBand™ network 10 to operate at one of sixteen available service levels. Hence, the requester can select an available service level (e.g., quality of service, priority, etc.) based on a selected priority of the WQE.

The pre-link module 40 provides both service level to virtual lane mapping (SL-VL mapping), and virtual lane arbitration. In particular, virtual lanes, defined in the InfiniBand™ Architecture Specification, enable multiple logical flows to be implemented over a single physical link, where link level flow control can be applied to one virtual lane without affecting other virtual lanes. The pre-link process module 54 is configured for managing and maintaining the service layer-virtual layer mapping table 56. In particular, the pre-link process module 54 retrieves a WQE from the WQE FIFO 50, and determines the corresponding virtual lane based on the service layer specified within the WQE. Upon identifying the appropriate virtual lane for the retrieved WQE, the pre-link process module 54 forwards the WQE to the corresponding virtual lane FIFO 52.

The pre-link module 40 includes virtual lane FIFOs 52*a*, 52*b*, 52*c*, 52*d*, 52*e*, and 52*f* for storage of WQEs based on the assignment by the pre-link process module 54. For example, the virtual lane FIFO 52*a* is used for storing WQEs associated with embedded processor operations, for example link layer control packets and handling of error conditions. In other words, when a prescribed operation is not implemented in hardware, the request is sent to an embedded processor queue 78 for further processing by an embedded processor 80, described below; hence the embedded processor 80 has its own assigned queue 52*a* for outputting packets into the flow of output data traffic. The virtual lane FIFO 52*b* is used for storing WQEs associated with management traffic. The virtual lane FIFOs 52*c*, 52*d*, 52*e*, and 52*f* are used for storing WQEs associated with respective assigned virtual lanes. Although the disclosed embodiment discloses the use of four assigned virtual lanes, additional virtual lane FIFOs may be added for additional assigned virtual lanes.

The VL arbitration module 60 is implemented as a state machine with registers, and is configured for managing the VL arbitration table 58 for servicing of the virtual lanes, including setup, management, and tear down of the virtual lanes. The VL arbitration module 60 also determines which virtual lane to service, and outputs the WQEs from the virtual lane FIFOs 52 based on the determined priority of the virtual lanes. For example, the virtual lane FIFO 52*b* typically stores management (high-priority) traffic, hence the VL arbitration module 60 typically would empty the virtual lane FIFO 52*b* before servicing the other virtual lane FIFOs 52*c*, 52*d*, 52*e*, or 52*f*. The VL arbitration module 60 would then selectively output the WQEs from the virtual lane FIFOs 52*c*, 52*d*, 52*e*, or 52*f* based on weighted priorities stored in respective weight tables within the VL arbitration table 58.

Hence, the pre-link module 40 outputs the WQEs in a prescribed order based on a determined priority of the WQEs, for example based on assigned virtual lanes, or whether the WQE is for an embedded process or management traffic.

The transport service module 42 is configured for managing transport services, including setup, management, and tear down of queue pairs. In particular, the HCA 120 includes a queue pair setup FIFO 62 configured for storing queue pair commands received from a communication agent. The communication agent is responsible for setup and tear down of transport connections: the communication agent communicates with a subnet manager to establish the transport connections (i.e., queue pairs) for the HCA 120. For example, the communication agent will determine the type of transport layer service to be used for communication, such as reliable connection service, reliable datagram service, unreliable connection service, unreliable datagram service, etc.; the communication agent will also determine a packet sequence number to be used at each end of the communication; the communication agent also will also determine what queue pair numbers are to be used for communication. For example, the local communication agent may elect to use queue pair number "10" and packet sequence number starting with "100", whereas the remote communication agent may elect to use queue pair number "100" and start the packet sequence number at "20". In addition, the communication agents at each end during connection establishment use a bypass service (described below with respect to bypass service submodule 68a), as opposed to a conventional transport layer service, to establish the transport connections.

The transport service module 42 includes a queue pair attributes database 64 and a queue pair attributes management module 66. The queue pair attributes management module 66 is configured for processing the queue pair commands in the queue pair setup FIFO 62, and updating the queue pair attributes database 64 based on the received queue pair commands. For example, the queue pair attributes database 64 stores information relating to a source queue pair number, a destination queue pair number, and possibly source agent and destination agent. Hence, the queue pair attributes database 64 will include all information necessary to support the different transport services, including reliable connection service, reliable datagram service, unreliable connection service, unreliable datagram service, and raw datagram service.

The queue pair attributes management module 66 manages the transport services by updating the queue pair attributes database 64 during communication between the local and remote communication agents, for example when packet sequence numbers increase as messages are exchanged between the local and remote communication agents.

The queue pair attributes management module 66 also includes service submodules 68, each configured for managing a corresponding transport service type based on a corresponding received WQE from the pre-link module 40. For example, the bypass service submodule 68a is configured for managing bypass services during connection establishment or managing queue pairs associated with management operations with network managers that use, for example, the raw datagram service. The CPU aided service submodule 68b is configured for managing queue pairs based on embedded processor operations using the embedded virtual lane FIFO 52a; hence, the CPU aided service submodule 68b enables coordination between the local and remote embedded processes; moreover, implementation of the CPU aided service submodule 68b in conjunction with the embedded virtual lane FIFO 52a enables messages to be retransmitted if a resend request is received from the remote communication agent.

The reliable connection (RC) service submodule 68c and the unreliable connection (UC) service submodule 68d are configured for managing queue pairs associated with reliable connection and unreliable connection transport services, respectively. Although not shown, the queue pair attributes management module 66 also includes submodules 68 for managing reliable and unreliable datagram services, and raw datagram service.

Hence, the transport service module 42, upon receiving a WQE from the pre-link module 40, supplies the WQE to the appropriate transport submodule 68 for processing (e.g., WQE for RC service handled by the RC service submodule 68c). The WQE includes service level (SL) information, and a pointer to the location of the actual message in the system memory 48. The submodule 68, in response to reception of the appropriate WQE, parses the WQE, and retrieves from the WQE the pointer that identifies the memory location for the transport data (i.e., the payload for the transport layer); the submodule 68 updates the appropriate queue pair attributes within the queue pair attributes database 64, and creates and stores in the external system memory 48 a transport layer header for the WQE in a corresponding transport format; for example, the submodule 68a may generate a raw transport header, whereas the modules 68c or 68d may generate a transport header according to the reliable connection service or the unreliable connection service, respectively. The submodule 68 then creates a header pointer (p1) that identifies the location of the transport layer header. The submodule 68 then sends to the post-link module 44 the payload pointer (p2) and the header pointer (p1), supplied by the corresponding WQE, as a packet request 90, enabling the post-ink module 44 to assemble the transport packet for transmission based on the supplied pointers. Alternately, the submodule 68 may generate a frame pointer to a system memory location that stores the transport layer frame, including the transport layer header and the transport data.

The post-link module 44, in response to reception of the transport layer information (e.g., transmit data pointer p1 and transport header pointer p2), fetches in sequence the transport layer header and the transport layer payload from the system memory 48 for transmission of the transmit packet.

In particular, the post-link module 44 also includes a link layer control module 72 configured for generating the transmit packet by generating link layer fields (e.g., local and global routing headers, cyclic redundancy check (CRC) fields, etc.), and performing DMA transfer of the transport packet header and the transmit data from the system memory 48. The link layer control module 72 utilizes an alignment buffer 70 having a size of a double-word (relative to the system memory 48) for aligning the transmit data from the DMA transfer of the system memory 48 to align the data between the DMA clock and the transmit clock of the InfiniBand™ network. The link layer control module also handles link layer control operations according to the InfiniBand™ Architecture Specification. Once the transmit packet has been output, the pointers are forwarded to the free buffer manager 76.

The link layer control module 72 outputs the transmit packets according to a credit-based flow control. In particular, the link layer control module 72 monitors the available credits for transmission of a transmit packet on the assignment virtual lane. In particular, credits are sent on a per virtual lane basis, where a receiver issues a credit based on packets taken from an incoming virtual lane buffer; the credits are sent to the sender, enabling the sender to manage flow control. Hence, if the link layer control module 72 determines that an identified virtual lane has an insufficient number of credits, the link layer control module 72 defers transmission of the corresponding transmit packet until a sufficient number of credits have been received, and sends the data flow interruption request to prevent generation of additional data packets, as described above with respect to FIG. 3. If the virtual lane has a sufficient number of credits, the link layer control module 72 forwards the transmit packet to the MAC module 46 for transmission, and if necessary outputs the resume data flow request as described above with respect to FIG. 3.

The MAC module 46 is configured for outputting the transmit packet from the alignment buffer 70 according to the InfiniBand™ Architecture Specification. In particular, the MAC module 46 includes a transmission module 74, a free buffer manager 76, an embedded processor input queue 78, and an embedded processor 80 having a link flow control packet construction module 82. The transmission module 74 is configured for performing media access control operations, and optionally physical layer transceiver operations, for transmission of the transmit packet onto the InfiniBand™ network 10.

The free buffer manager 76 is configured for releasing available space from the external memory 48 once the transmit packet has been successfully received by the responder. In particular, the memory pointers for a transmit packet are sent from the post-link module 44 once the transmit packet has been generated; if a responder sends a message that the transmit packet needs to be resent in a reliable connection service, the transmit packet can be regenerated by the post-link module 44 and retransmitted to the responder. Once the transmit packet is successfully received, the frame pointers can be released for use by another agent.

Flow control is handled by the embedded processor 80 based on reception of information from the embedded processor input queue 78: in particular, the flow control protocol according to the InfiniBand Architecture Specification uses a credit-based flow control. The embedded processor 80 generates link flow control packets using the link flow control packet construction module 82, based on messages stored into the embedded processor input queue 78. The embedded processor 80 writes the link flow control packet to external memory 48; the embedded processor 80 then generates a WQE that includes the associated operation and a pointer specifying the location of a flow control packet into the embedded processor virtual lane FIFO 52*a*. The link flow control packet can then be output, specifying a number of available credits for another transmitting node.

Hence, the embedded processor 80 can generate a link flow control frame including the flow control header, and output the link flow control frame to the error processor input queue 78 for transmission to the network.

According to the disclosed embodiment, application operations are suspended based on detecting a depletion of flow control credits for a prescribed virtual lane, enabling network congestion to the reduced without wasting processor resources or system memory. Hence, processor resources and system memory can be redirected to unaffected application resources, optimizing efficiency in the network node.

Although the disclosed embodiment is directed to an InfiniBand™ network node in an InfiniBand™ network, it will be appreciated that the disclosed arrangement may be applied to other network protocols.

While this invention has been described with what is presently considered to be the most practical preferred embodiment, it is to be understood that the invention is not limited to the disclosed embodiments, but, on the contrary, is intended to cover various modifications and equivalent arrangements included within the spirit and scope of the appended claims.

What is claimed is:

1. A method in a network node, the method comprising:
   detecting by a network interface in the network node a depletion of flow control resources representing a depletion of network bandwidth for a prescribed data stream;
   outputting by the network interface a data flow interruption request based on the detected depletion of flow control resources; and
   reducing, by a processor in the network node and based on the data flow interruption request, the prescribed data stream by reducing execution of a prescribed application resource configured for generating the prescribed data stream.

2. The method of claim 1, wherein the network interface is configured for outputting the prescribed data stream according to InfiniBand™ protocol, the detecting step including detecting depletion of flow control credits, as the flow control resources, for a prescribed virtual lane.

3. The method of claim 2, wherein the outputting step includes outputting the data flow interruption request to a memory controller configured for controlling access to system memory resources, the memory controller rendering unavailable the system memory resources for the prescribed application resource in response to reception of the data flow interruption request.

4. The method of claim 3, wherein the reducing step includes halting execution of the prescribed application resource, based on a determined unavailability of the system memory resources.

5. The method of claim 4, further comprising outputting by the network interface a resume data flow request based on a detected replenishment of the flow control resources for the prescribed data stream.

6. The method of claim 5, further comprising resuming execution of the prescribed application resource based on the resume data flow request.

7. The method of claim 1, wherein the outputting step includes outputting the data flow interruption request to a memory controller in the network node and that is configured for controlling access to system memory resources in the network node, the memory controller rendering unavailable the system memory resources for the prescribed application resource in response to reception of the data flow interruption request.

8. A network node comprising:
   a network interface configured for detecting a depletion of flow control resources representing a depletion of network bandwidth for a prescribed data stream, the network interface configured for outputting a data flow interruption request based on the detected depletion of flow control resources; and
   a processor configured for executing a prescribed application resource for generation of the prescribed data stream, the processor configured for reducing the prescribed data stream by reducing execution of the prescribed application resource, based on the data flow interruption request.

9. The network node of claim 8, further comprising a memory controller configured for controlling access to system memory resources, the memory controller configured for rendering unavailable the system memory resources for the prescribed application resource in response to reception of the data flow interruption request.

10. The network node of claim 9, wherein the processor is configured for reducing the execution of the prescribed application resource based on detecting the unavailability of the system memory resources.

11. The network node of claim 10, wherein the network interface is configured for outputting a resume data flow request based on a detected replenishment of the flow control resources for the prescribed data stream.

12. The network node of claim 11, wherein the processor is configured for resuming execution of the prescribed application resource based on the resume data flow request.

13. The network node of claim 8, wherein the network interface is configured for outputting the prescribed data stream according to InfiniBand™ protocol, the network interface configured for detecting depletion of flow control credits, as the flow control resources, for a prescribed virtual lane.

* * * * *